United States Patent
Seltzer et al.

(10) Patent No.: US 12,289,330 B2
(45) Date of Patent: Apr. 29, 2025

(54) TECHNIQUES FOR SECURING SERVICES USING INTER-SERVICE VISIBILITY

(71) Applicant: AtmoSec Ltd., Tel Aviv (IL)

(72) Inventors: Michael Seltzer, Evanston, IL (US); Aner Gelman, Tel Aviv (IL); Shaked Gitelman, Tel Aviv (IL)

(73) Assignee: Check Point Software Technologies Ltd., Tel Aviv (IL)

( * ) Notice: Subject to any disclaimer, the term of this patent is extended or adjusted under 35 U.S.C. 154(b) by 438 days.

(21) Appl. No.: 17/818,113

(22) Filed: Aug. 8, 2022

(65) Prior Publication Data

US 2024/0048574 A1   Feb. 8, 2024

(51) Int. Cl.
    *H04L 9/40*   (2022.01)
(52) U.S. Cl.
    CPC ................. *H04L 63/1425* (2013.01)
(58) Field of Classification Search
    None
    See application file for complete search history.

(56) References Cited

U.S. PATENT DOCUMENTS

| | | | |
|---|---|---|---|
| 9,043,458 B2 | 5/2015 | Balaji et al. | |
| 10,142,174 B2 | 11/2018 | Yang et al. | |
| 10,606,353 B2 | 3/2020 | Coleman et al. | |
| 10,621,346 B1* | 4/2020 | Singh | H04L 9/3239 |
| 10,673,885 B2 | 6/2020 | Muthukrishnan et al. | |
| 10,917,439 B2 | 2/2021 | Puratheppparambil et al. | |
| 2005/0021740 A1* | 1/2005 | Bar | H04L 63/145 |
| | | | 709/224 |
| 2015/0347542 A1* | 12/2015 | Sullivan | G06F 9/5072 |
| | | | 707/602 |
| 2019/0260794 A1 | 8/2019 | Woodford et al. | |
| 2020/0252415 A1 | 8/2020 | Hamdi | |

FOREIGN PATENT DOCUMENTS

WO   WO-2021133479 A1 *  7/2021  ......... H04L 41/0609

* cited by examiner

*Primary Examiner* — William J. Goodchild
(74) *Attorney, Agent, or Firm* — Rivka Friedman

(57) ABSTRACT

A system and method for securing software as a service (SaaS) platforms by providing inter-service visibility. A method includes identifying, based on log data of a first service, a second service connected to the first service, wherein each of the first service and the second service is a set of functions for performing a respective task, wherein the second service is called by the first service; identifying a plurality of patterns in communications between the first service and the second service in the log data of the first service; creating, based on the identified plurality of patterns, a baseline for communications between the first service and the second service; detecting an anomalous communication between the first service and the second service, wherein the anomalous communication deviates from the baseline; and performing a mitigation action with respect to the detected anomalous communication.

27 Claims, 4 Drawing Sheets

TECHNIQUES FOR SECURING SERVICES USING INTER-SERVICE VISIBILITY

TECHNICAL FIELD

The present disclosure relates generally to cybersecurity for interoperable computing services, and more specifically to securing services based on connections between computing services.

BACKGROUND

In recent years, there has been an explosion in the use of various services implemented using the software-as-a-service (SaaS) model. SaaS is a software licensing model in which software is provided on a subscription service, where the services being offered are realized as software stored on an external server (i.e., a server that is external to the device being provided the service). With the explosive growth of SaaS services, the amount of interconnectivity between such services has also grown exponentially. Many SaaS providers have focused their offerings in order to provide services used for specific tasks that perform those specific tasks very well but do not perform all related tasks. To facilitate adoption of such focused services, SaaS providers are increasingly providing inter-operation of services, for example via integrations of services.

Further, to facilitate user adoption of SaaS services, many SaaS platforms today provide software applications ("apps"), addons, and integrations. Additionally, integration platform as a service (iPaaS) solutions have been developed to facilitate connections between services.

The increased interoperability between services provides challenged to security teams seeking to protect an organization against cyber threats. On one hand, the security team would generally prefer to limit what can be installed on user devices and require prior approval for any new installations. On the other hand, putting such obstacles to installation causes friction which may discourage end users from utilizing services which might otherwise increase productivity.

Moreover, users may utilize unsanctioned SaaS services even when approval is required by installing software that utilizes the unsanctioned services without knowledge of the security team (e.g., by purchasing the software through a personal account or by downloading a free version of the software). These "shadow" SaaS services are hidden from the security team and therefore make protecting the organization's computing environments much more difficult.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for securing software as a service (SaaS) platforms by providing inter-service visibility. The method comprises: identifying, based on log data of a first service, a second service connected to the first service, wherein each of the first service and the second service is a set of functions for performing a respective task, wherein the second service is called by the first service; identifying a plurality of patterns in communications between the first service and the second service in the log data of the first service; creating, based on the identified plurality of patterns, a baseline for communications between the first service and the second service; detecting an anomalous communication between the first service and the second service, wherein the anomalous communication deviates from the baseline; and performing a mitigation action with respect to the detected anomalous communication.

Certain embodiments disclosed herein also include a non-transitory computer readable medium having stored thereon causing a processing circuitry to execute a process, the process comprising: identifying, based on log data of a first service, a second service connected to the first service, wherein each of the first service and the second service is a set of functions for performing a respective task, wherein the second service is called by the first service; identifying a plurality of patterns in communications between the first service and the second service in the log data of the first service; creating, based on the identified plurality of patterns, a baseline for communications between the first service and the second service; detecting an anomalous communication between the first service and the second service, wherein the anomalous communication deviates from the baseline; and performing a mitigation action with respect to the detected anomalous communication.

Certain embodiments disclosed herein also include a system for securing software as a service (SaaS) platforms by providing inter-service visibility. The system comprises: a processing circuitry; and a memory, the memory containing instructions that, when executed by the processing circuitry, configure the system to: identify, based on log data of a first service, a second service connected to the first service, wherein each of the first service and the second service is a set of functions for performing a respective task, wherein the second service is called by the first service; identify a plurality of patterns in communications between the first service and the second service in the log data of the first service; create, based on the identified plurality of patterns, a baseline for communications between the first service and the second service; detecting an anomalous communication between the first service and the second service, wherein the anomalous communication deviates from the baseline; and perform a mitigation action with respect to the detected anomalous communication.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

In light of the challenges noted above, it has been identified that techniques for learning connections between services, and particularly for identifying potentially hidden connections, would be highly useful for securing computing environments in which devices access services. Moreover, in order to identify such connections between services and due to the presence of shadow services that may be hidden from security teams, techniques for identifying the services themselves would be particularly useful. To this end, the disclosed embodiments provide various techniques for discovering such connections and for securing services based on those connections. The disclosed embodiments leverage data contained in logs and data accessible via calling application programming interface (API) methods for services in order to unearth connections between services, thereby providing visibility into software as a service (SaaS).

Once visibility is established with respect to connections between services, baseline behavioral patterns are learned for each service and for each pair of connected services. Subsequent communications between services may be monitored for deviations from the respective baseline behavioral patterns in order to detect anomalous behavior for services. This allows for accurately identifying where mitigation is needed. Mitigation actions are performed with respect to detected anomalous behaviors.

The various disclosed embodiments include techniques for securing SaaS platforms by providing inter-SaaS visibility. In an embodiment, a second SaaS service connected to a first SaaS service is identified using logs and an API of a first service. The connection is added to a services connections graph. Patterns in communications between the first service and the second service are identified and utilized to create a baseline for communications between the first and second services. In various embodiments, the process is iterated until all connections between pairs of services are identified, graphed, and used to create baselines for their respective pairs of services.

Communications between the first and second services are monitored and compared against the baseline in order to detect one or more anomalous communications that deviate from the baseline. These anomalous communications are indicative of anomalous behavior on the part of one service with respect to another service. When the anomalous communications are detected, mitigation actions are performed in order to mitigate the anomalous behavior. The mitigation actions may include, but are not limited to, generating alerts, blocking communications between services, both, and the like.

Figure 1:
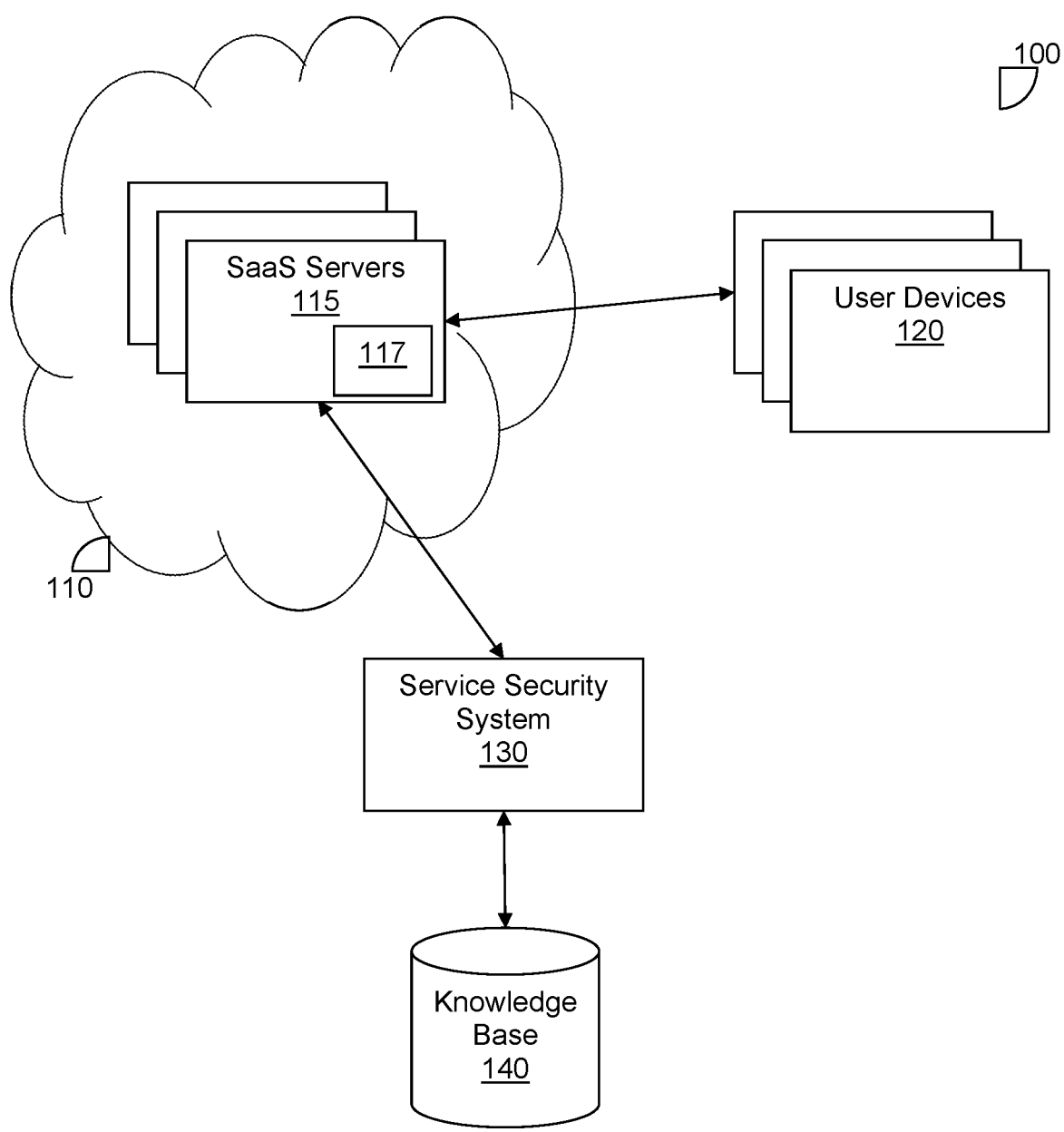
FIG. 1 is a network diagram utilized to describe various disclosed embodiments.

FIG. 1 shows an example network diagram 100 utilized to describe the various disclosed embodiments. In the example network diagram 100, a cloud computing environment 110, one or more user devices 120, a service security system 130, and a knowledge base 140 communicate.

The cloud computing environment 110 hosts one or more services 117. The cloud computing environment 110 offers services by communicating (e.g., with the user devices 120) via one or more networks (networks not depicted in FIG. 1). Such networks may include, but are not limited to, a wireless, cellular or wired network, a local area network (LAN), a wide area network (WAN), a metro area network (MAN), the Internet, the worldwide web (WWW), similar networks, and any combination thereof.

The cloud computing environment 110 includes one or more SaaS servers 115 including resources used for providing the services 117. To this end, the SaaS servers 115 store instructions, policies, and any other data which make up the services 117. Each of the services 117 is a set of functions for performing one or more tasks, where each function is realized as a set of computer readable instructions. It should be noted that the SaaS servers 115 may be realized via software alone (e.g., as virtual machines) or via software running on respective hardware components (e.g., hardware servers) without departing from the scope of the disclosure.

To accomplish its respective tasks, each service 117 may utilize one or more application programming interfaces (APIs, not shown) to communicate with other services, applications, or other software components. To this end, each service 117 may be configured for one or more API calls. Activities by the services may be logged and recorded, for example by storing logs (not shown) in the SaaS servers 115 or in another data source (not shown) in the cloud computing environment 110.

Each user device 120 may be, but is not limited to, a personal computer, a laptop, a tablet computer, a smartphone, a wearable computing device, or any other device capable of requesting services from the cloud computing environment 110. When a user device 120 requests a service 117 from the cloud computing environment 110, instructions of the requested service 117 are executed via one or more of the SaaS servers 115. As discussed herein, any of the services 117 may be connected to each other such that one of the services 117 calls another. Accordingly, when a user requests a first service among the services 117, that request may further trigger calls to other services among the services 117. For example, the first service may call a second service.

In accordance with various disclosed embodiments, the services security system 130 is configured to unearth connections among the services 117, to map connections between and among the services 117, and to establish baselines for communications between services of the services 117. The service security system 130 may further be configured to monitor communications between services for deviations from the respective baselines and to detect anomalous behavior based on those deviations. The service security system 130 may be further configured to mitigate such anomalous behaviors, for example by generating alerts or by blocking communications between services of the services 117.

In an embodiment, the service security system 130 is further configured to store data relates to the connections between the services 117 in the knowledge base 140. In particular, the knowledge base 140 stores a services graph including nodes representing respective services among the services 117 and edges representing connections between services. The knowledge base 140 and, in particular, the services graph stored therein, may further store baselines for communications between services created as described herein.

It should be noted that a single cloud computing environment 110 is illustrated in FIG. 1 merely for simplicity purposes, and that the disclosed embodiments may be equally applied to unearth connections between services in different cloud computing environments.

Figure 2:
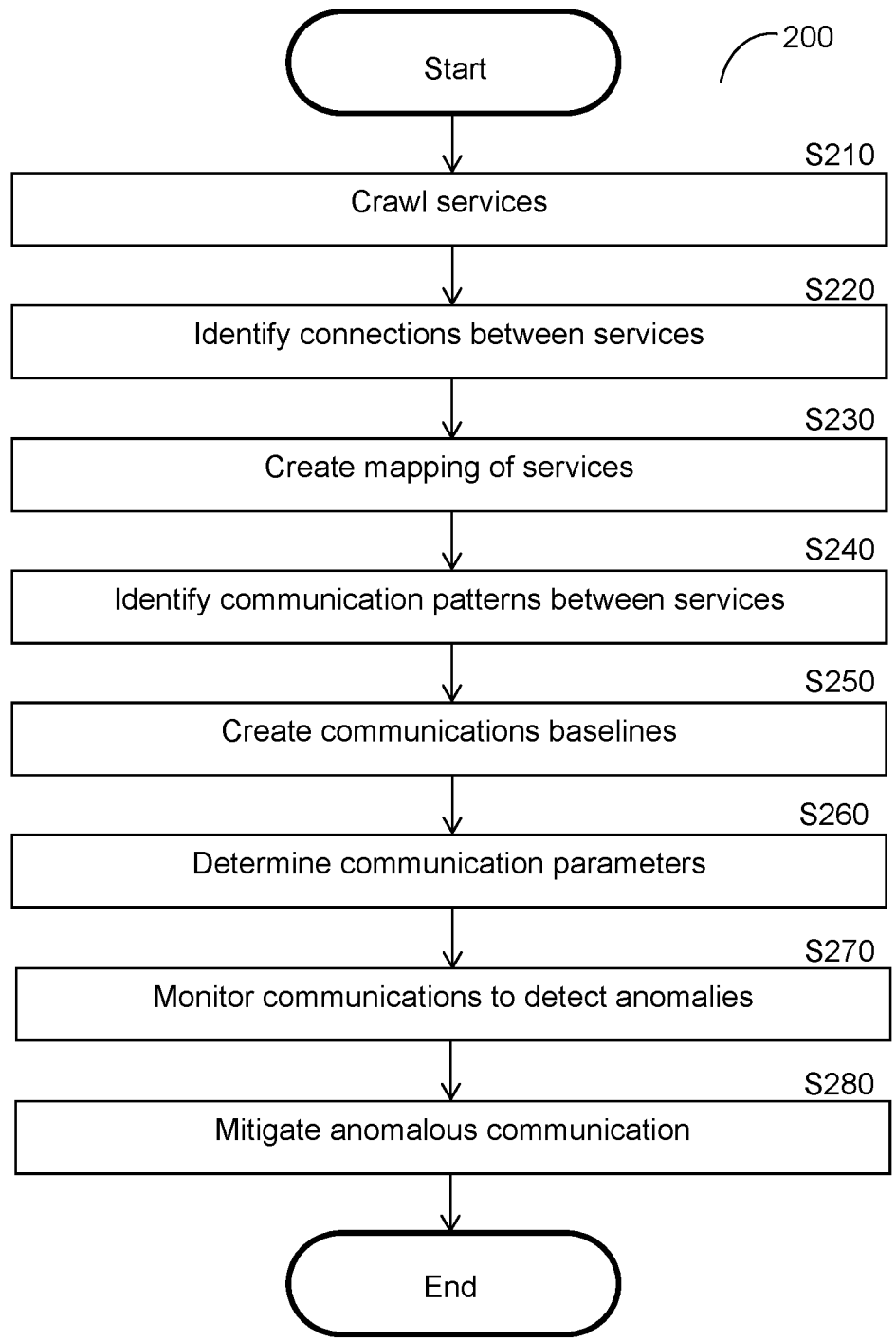
FIG. 2 is a flowchart illustrating a method for securing services using inter-service visibility according to an embodiment.

FIG. 2 is an example flowchart 200 illustrating a method for securing services using inter-service visibility according to an embodiments. In an embodiment, the method is performed by the service security system 130.

At S210, services (e.g., the services 117, FIG. 1) are crawled in order to discover services in a computing environment (e.g., the cloud computing environment 110). In an embodiment, the crawling begins at a set of seed services provided as inputs (e.g., by an operator of the computing environment). Data in logs and APIs of the seed service are analyzed in order to identify connected services. Data in logs and APIs of the connected services identified at each iteration are analyzed to identify further connected services until no more connected services are identified in a given iteration, thereby illuminating all of the services which are connected (either directly or indirectly through other services) to the seed services across the different iterations.

Figure 3:
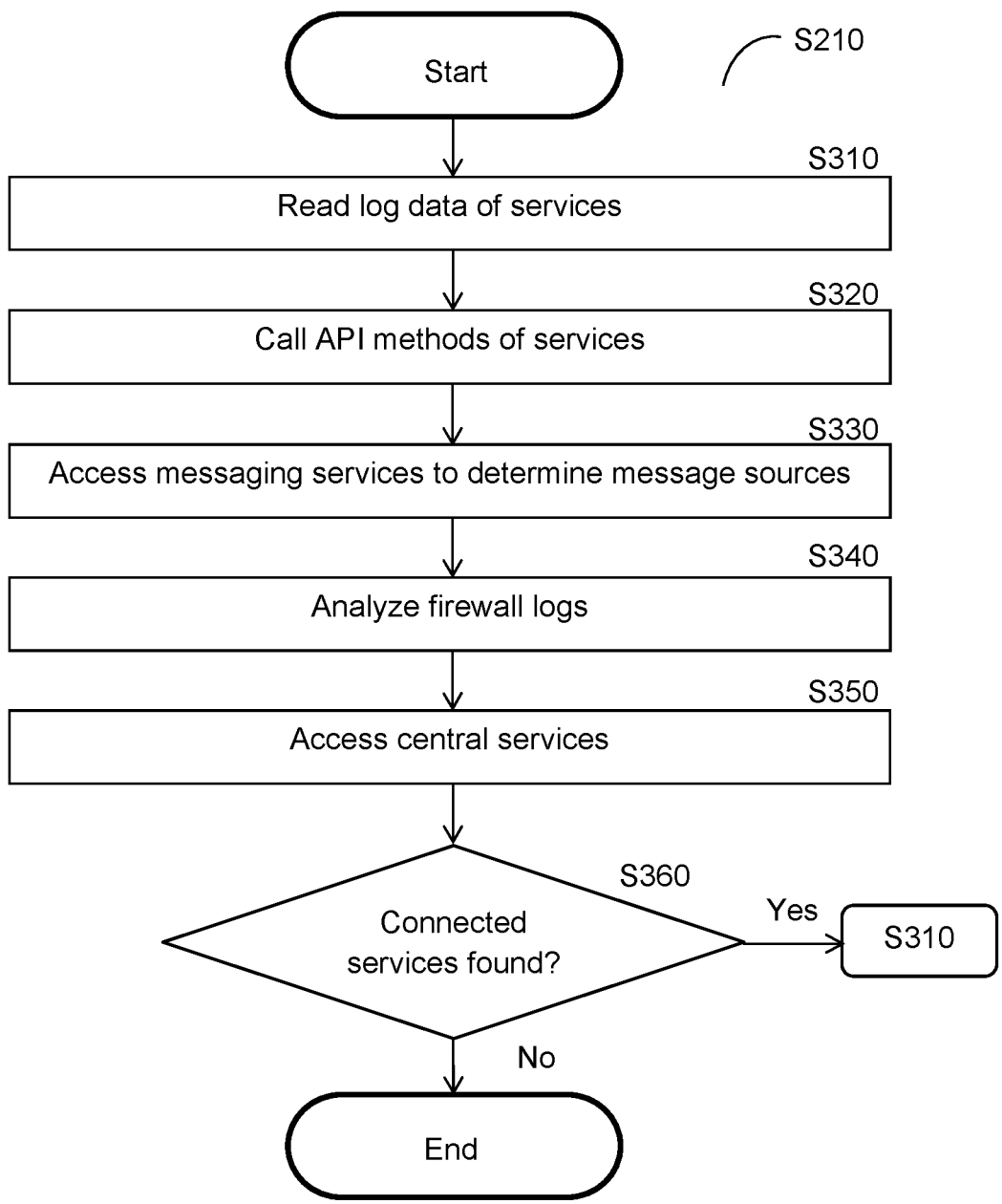
FIG. 3 is a flowchart illustrating a method for crawling services according to an embodiment.

In an embodiment, the crawling of services is performed as now described with respect to FIG. 3. FIG. 3 is an example flowchart S210 illustrating a method for crawling services according to an embodiment.

At S310, log data of one or more services is read. In an embodiment, during a first iteration of the method of FIG. 3, log data for one or more seed services is read. The seed services are a set of pre-identified services that are provided as inputs for the start of the crawling.

In an embodiment, the log data at least includes data from audit logs of the services. The audit log for a service includes log data indicating events involving the service and changes made to the service. The events recorded in the audit log may be activities or sequences of activities, and the log data related to these events may include, but is not limited to, who performed an activity (e.g., a user or service that performed an activity involving calling the service), what activity was performed (e.g., calling another service, accessing a data store, etc.), and how the system executing the service (e.g., one of the SaaS servers 115) responded to the activity. As non-limiting examples, event logs included among the audit log may indicate information such as "API key A called method X from service B" or "Entity E authenticated/logged in to Service B").

In another embodiment, the log data includes data from installation logs. The installation logs relate to granting or removing access for services such as creating an API key for a service, revoking an API key for a service, giving permission to a user to access an object via a service, revoking permission of a user to access an object via a service, combinations thereof, and the like. As non-limiting examples, the installation log may indicate information such as "API key A was created for service B," "API key A was revoked from service B," "User U was given permissions to object X in service A," and the like.

The log data may be obtained via API, from the services themselves, or via integration with security information and event management (SIEM) tools. To this end, in an embodiment, S310 may further include calling API methods that return logs, requesting the logs to be exported (e.g., via streaming) from the one or more services, integrating with SIEM tools in order to retrieve the logs, a combination thereof, and the like.

In some implementations, the audit logs may not be available directly. To this end, in some embodiments, S310 may include recreating the logs based on portions of the accessed log data, other evidence of changes in the system, or both.

At S320, API methods of the services are called. In an embodiment, during a first iteration of the method of FIG. 3, API methods accessible to the seed services are called. During subsequent iterations, API methods accessible to connected services identified during the last iteration may be called. The API methods may be queried for information such as, but not limited to, lists, specific objects, both, and the like.

The lists may include, but are not limited to, lists of software applications ("apps"), lists of users, lists of keys, combinations thereof, and the like. As non-limiting examples, lists may be obtained by performing one or more of the following queries: "query service A for all currently installed apps", "query service A for current users", "query service A for deleted users", and the like.

The specific objects may include, but are not limited to, keys, users, changes, combinations thereof, and the like. As non-limiting examples, information about specific objects may be obtained by performing one or more of the following queries: "query user A for keys that it generated", "query object O for which users/keys has access to it", "query key K for recent changes to it", and the like.

At S330, messaging services are accessed in order to uncover additional contextual data related to the usage of the services. A domain or other source of a service indicated in several messages received by a user can be utilized to determine that the user has access to that service. This information may be utilized to further improve the graph including the mapping of services as described further below.

At S340, firewall logs a firewall used in a computing environment of the services are analyzed in order to identify where traffic is going (e.g., to which services packets are being sent). By analyzing these firewall logs, it can be determined which SaaS services are being used by which users or other services. This information may be utilized to further improve the graph including the mapping of services as described further below.

At S350, one or more central services are identified and accessed. Each central service is a service that hosts one or more other services and integrates the hosted services therein. Data in the identified central services is accessed.

In this regard, it is noted that central services (i.e., services which host and integrate other services) often have data about many different SaaS services that users are able to log into, and that central services may include data even about services which are not directly integrated into those central services. As a non-limiting example, a central service may integrate a cloud access security broker or other detection tool, and therefore have visibility into services beyond the services which are directly integrated into the central service. Accordingly, reading logs of central services for such data allows for enriching the context of information used to map services and to establish baselines, thereby improving the accuracy of anomaly detection.

At S360, it is checked whether connected services were found during the current iteration and, if so, execution continues with S310 where log data of those newly found connected services are read and execution proceeds with further analysis of the connected services. In this manner, execution may continue iterating until no new connected services are found during a given iteration.

By iterating in this manner, the entire group of services connected to the seed services (either directly or indirectly through other services) can be discovered and mapped. The resulting graph contains a mapping of all of the SaaS services used by an organization (e.g., in a computing environment of that organization) as well as any connections between those services. Notably, by crawling services as described herein, all of the sanctioned services (i.e., services which are approved for use by users within the organization) as well as all shadow services (i.e., services which are not necessarily approved for use and which are not otherwise known to the operator of a computing environment) are mapped, thereby providing visibility into these shadow services which can be leveraged to secure the computing environments in which the services are deployed.

Returning to FIG. 2, at S220, connections are identified between services based on the results of the crawling. As noted above, during the crawling, logs and APIs of services are read and analyzed in order to identify services which can be called by other services such that those services are connected. Those connections are identified.

At S230, a mapping between services is created. The mapping may be realized, for example, in the form of a services graph including nodes representing services and edges representing connections between services. Creating the mapping may include creating a new mapping or updating an existing mapping with any newly identified connections and services.

At S240, patterns in communications between connected services are identified.

In an embodiment, the patterns are defined with respect to characteristics of the communications between services such as, but not limited to, permissions granted for each communication, frequency of communications, which methods (e.g., API methods) are called during communications and how often those methods are called for communications between any given pair of connected services, types of data being transferred in communications, amounts of data being transferred, users for whom communications are performed (e.g., users who requested a service which proceeded to communicate with other services), combinations thereof, and the like.

In a further embodiment, the patterns may include, but are not limited to, periodic communication patterns, reactionary communication patterns, or both. Periodic communication patterns include repeating the same event periodically (e.g., hourly, daily, weekly, etc.). As a non-limiting example, a periodic communication pattern may be calling of the same API method every 5 hours. Reactionary communication patterns include one event when another event has occurred. As a non-limiting example, a reactionary communication pattern may be an event happening in service A (e.g., a user triggering a particular flow) followed by a method being called in service B. Baselines may be defined with respect to these or other patterns.

In this regard, it has been identified that user activities may be unpredictable even when users are not acting maliciously, but that communications between SaaS services and the automated tasks performed by those services tend to be highly predictable. By identifying patterns in communications between services, reliable baselines can be established and used to monitor for abnormal behaviors.

At S250, a communications baseline is created for each pair of connected services. Each pair of connected services is a set of two services which are directly connected such that one service is capable of calling the other service and is configured to call the other service at least in some circumstances. In an embodiment, a communications baseline may also be determined for each individual service.

As noted above, identifying patterns may be realized via machine learning. Accordingly, in such embodiments, the baseline may be realized as a machine learning model trained using the communications in which patterns were to be identified as described above. Once trained, the machine learning model can be applied to subsequent communications between services in order to determine whether the communications between the services are anomalous. To this end, the machine learning model may be trained across different pairs of services such that the machine learning model can identify abnormal behaviors that are abnormal either with respect to specific pairs of connected services or more generally with respect to communications between services (e.g., with respect to communications between any services or between services in a given computing environment). Alternatively, different machine learning models may be trained for different pairs of services, different computing environments, and the like. Likewise, each machine learning model may be trained to identify anomalies from baselines defined with respect to different communication parameters, or different machine learning models may be trained to identify anomalies from baselines defined with respect to different machine learning model.

At S260, communication parameters are determined from among communications between the services. The communication parameters may include, but are not limited to, types of data being accessed, locations (e.g., as defined by Internet Protocol addresses) from which calls arrive at services (e.g., individual addresses, addresses grouped by country or provider, etc.), amount of data being transferred per time period (e.g., amount of data copied per minute, hour, day, week, etc.), specific methods being called, combinations thereof, and the like.

At S270, one or more anomalous communications are detected based on the determined communication parameters.

As noted above, the baselines may be realized via one or more machine learning models. To this end, the anomalous communications may be detected based on outputs of the machine learning models. More specifically, the machine learning models may be trained to identify anomalies in communication parameters, and communications having anomalous communication parameters may be detected as anomalous communications.

As a non-limiting example, when the baseline establishes that a specific method is called only once a day in different cloud computing environments, communications calling the method which cumulatively call the method more than once a day in a particular cloud computing environment are detected as anomalous. As another non-limiting example, if the baseline establishes that only methods X, Y, and Z are called in a particular computing environment, whether anomalous communications are detected when a new method A is called may depend on whether the new method A is called in at least a threshold number or proportion of computing environments, or whether the new method A is called in only a single computing environment. If the new method is called only in one computing environment, then communications including calls to the new method are detected as anomalous; otherwise, communications including calls to the new method are not detected as anomalous.

At S280, the anomalous communications are mitigated. In an embodiment, S280 includes performing one or more mitigation actions such as, but not limited to, generating an alert, blocking communications between services, both, and the like. The blocked communications may be between pairs of services for which anomalous communications were detected based on communication parameters for communications between those pairs of services.

Figure 4:
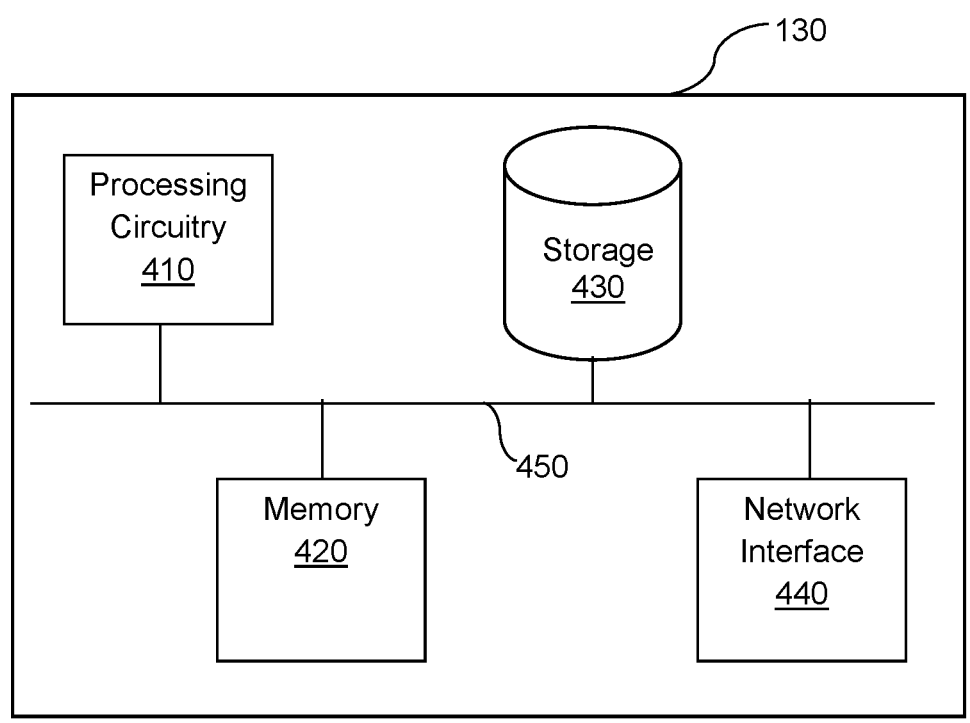
FIG. 4 is a schematic diagram of a service security system according to an embodiment.

FIG. 4 is an example schematic diagram of a service security system 130 according to an embodiment. The service security system 130 includes a processing circuitry 410 coupled to a memory 420, a storage 430, and a network interface 440. In an embodiment, the components of the system 130 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 420 may be volatile (e.g., random access memory, etc.), non-volatile (e.g., read only memory, flash memory, etc.), or a combination thereof.

In one configuration, software for implementing one or more embodiments disclosed herein may be stored in the storage 430. In another configuration, the memory 420 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein.

The storage 430 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 440 allows the service security system 130 to communicate with, for example, the cloud computing environment 110, the knowledge base 140, and the like.

It should be understood that the embodiments described herein are not limited to the specific architecture illustrated in FIG. 4, and other architectures may be equally used without departing from the scope of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for securing software as a service (SaaS) platforms by providing inter-service visibility, comprising:
    identifying, based on log data of a first service, a second service connected to the first service, wherein each of the first service and the second service is a set of functions for performing a respective task, wherein the second service is called by the first service;
    identifying a plurality of patterns in communications between the first service and the second service in the log data of the first service;
    creating, based on the identified plurality of patterns, a baseline for communications between the first service and the second service;
    determining at least one communication parameter for each communication between the first service and the second service;
    detecting an anomalous communication between the first service and the second service, wherein the anomalous communication deviates from the baseline, and wherein the anomalous communication is detected based further on the determined at least one communication parameter for each communication between the first service and the second service; and performing a mitigation action with respect to the detected anomalous communication.

2. The method of claim 1, further comprising:
crawling through a plurality of services including the first service and the second service, wherein a connection between the first service and the second service is identified while crawling through the plurality of services.

3. The method of claim 2, wherein crawling through the plurality of services further comprises:
iteratively analyzing log data of services among the plurality of services during a plurality of iterations, the plurality of iterations including a first iteration and at least one subsequent iteration, wherein log data of at least one seed service is analyzed during the first iteration, wherein the log data analyzed during each of the at least one subsequent iteration is for at least one service identified during a prior iteration of the plurality of iterations.

4. The method of claim 1, further comprising:
identifying a central service among the first service and the second service, wherein the central service hosts at least one other service, wherein the at least one other service is integrated in the central service; and
accessing data of the central service, where the baseline is created based further on the accessed data of the central service.

5. The method of claim 1, further comprising:
accessing audit logs of the first service and of the second service, wherein the at least one communication parameter is determined based on the accessed audit logs.

6. The method of claim 1, further comprising:
making a first API call to the first service and a second API call to the second service, wherein the at least one communication parameter is determined based on at least one of: a response to the first API call, and a response to the second API call.

7. The method of claim 1, wherein creating the baseline further comprises training a machine learning model using features extracted from the plurality of patterns in communication, wherein detecting the anomalous communication further comprises applying the machine learning model to features extracted from the log data of the first service.

8. The method of claim 1, wherein the mitigation action includes blocking at least a portion of the communications between the first service and the second service.

9. The method of claim 1, further comprising:
creating a mapping of services including the first service and the second service, wherein the second service is connected to the first service in the mapping, wherein the mapping further includes the created baseline for communications between the first service and the second service.

10. The method of claim 9, further comprising:
accessing at least one messaging service used by a user having access to the first service; and
identifying at least one repeated source location for messages accessed via the at least one messaging service, wherein the mapping of services is created based further on the identified at least one repeated source.

11. The method of claim 9, further comprising:
analyzing firewalls logs of a firewall used in a computing environment in which the first service and the second service are deployed, wherein the mapping of services is created based further on the analysis of the firewall logs.

12. The method of claim 1, wherein identifying the second service connected to the first service further comprises:
calling an application programming interface (API) method of the first service, wherein the called API method returns an indication that the first service has permission to connect to the second service.

13. A non-transitory computer readable medium having stored thereon instructions for causing a processing circuitry to execute a process, the process comprising:
identifying, based on log data of a first service, a second service connected to the first service, wherein each of the first service and the second service is a set of functions for performing a respective task, wherein the second service is called by the first service;
identifying a plurality of patterns in communications between the first service and the second service in the log data of the first service;
creating, based on the identified plurality of patterns, a baseline for communications between the first service and the second service;
determining at least one communication parameter for each communication between the first service and the second service;
detecting an anomalous communication between the first service and the second service, wherein the anomalous communication deviates from the baseline, and wherein the anomalous communication is detected based further on the determined at least one communication parameter for each communication between the first service and the second service; and
performing a mitigation action with respect to the detected anomalous communication.

14. The non-transitory computer readable medium of claim 13, wherein the process further comprises:
accessing audit logs of the first service and of the second service, wherein the at least one communication parameter is determined based on the accessed audit logs.

15. The non-transitory computer readable medium of claim 13, wherein the process further comprises:
making a first API call to the first service and a second API call to the second service, wherein the at least one communication parameter is determined based on at least one of: a response to the first API call, and a response to the second API call.

16. A system for securing software as a service (SaaS) platforms by providing inter-service visibility, comprising:
a processing circuitry; and
a memory, the memory containing instructions that, when executed by the processing circuitry, configure the system to:
identify, based on log data of a first service, a second service connected to the first service, wherein each of the first service and the second service is a set of functions for performing a respective task, wherein the second service is called by the first service;
identify a plurality of patterns in communications between the first service and the second service in the log data of the first service;
create, based on the identified plurality of patterns, a baseline for communications between the first service and the second service;
determining at least one communication parameter for each communication between the first service and the second service;

detect an anomalous communication between the first service and the second service, wherein the anomalous communication deviates from the baseline, and wherein the anomalous communication is detected based further on the determined at least one communication parameter for each communication between the first service and the second service; and perform a mitigation action with respect to the detected anomalous communication.

17. The system of claim 16, wherein the system is further configured to:

crawl through a plurality of services including the first service and the second service, wherein a connection between the first service and the second service is identified while crawling through the plurality of services.

18. The system of claim 17, wherein the system is further configured to:

iteratively analyze log data of services among the plurality of services during a plurality of iterations, the plurality of iterations including a first iteration and at least one subsequent iteration, wherein log data of at least one seed service is analyzed during the first iteration, wherein the log data analyzed during each of the at least one subsequent iteration is for at least one service identified during a prior iteration of the plurality of iterations.

19. The system of claim 16, wherein the system is further configured to:

identify a central service among the first service and the second service, wherein the central service hosts at least one other service, wherein the at least one other service is integrated in the central service; and access data of the central service, where the baseline is created based further on the accessed data of the central service.

20. The system of claim 19, wherein the system is further configured to:

access audit logs of the first service and of the second service, wherein the at least one communication parameter is determined based on the accessed audit logs.

21. The system of claim 19, wherein the system is further configured to:

make a first API call to the first service and a second API call to the second service, wherein the at least one communication parameter is determined based on at least one of: a response to the first API call, and a response to the second API call.

22. The system of claim 16, wherein creating the baseline further comprises training a machine learning model using features extracted from the plurality of patterns in communication, wherein detecting the anomalous communication further comprises applying the machine learning model to features extracted from the log data of the first service.

23. The system of claim 16, wherein the mitigation action includes blocking at least a portion of the communications between the first service and the second service.

24. The system of claim 16, wherein the system is further configured to:

create a mapping of services including the first service and the second service, wherein the second service is connected to the first service in the mapping, wherein the mapping further includes the created baseline for communications between the first service and the second service.

25. The system of claim 24, wherein the system is further configured to:

access at least one messaging service used by a user having access to the first service; and identify at least one repeated source location for messages accessed via the at least one messaging service, wherein the mapping of services is created based further on the identified at least one repeated source.

26. The system of claim 24, wherein the system is further configured to:

analyze firewalls logs of a firewall used in a computing environment in which the first service and the second service are deployed, wherein the mapping of services is created based further on the analysis of the firewall logs.

27. The system of claim 16, wherein the system is further configured to:

call an application programming interface (API) method of the first service, wherein the called API method returns an indication that the first service has permission to connect to the second service.

* * * * *